Sept. 15, 1936.  L. C. HUCK ET AL  2,054,629
METHOD OF MANUFACTURING RIVETS
Filed July 21, 1933  4 Sheets-Sheet 1

INVENTORS.
Louis C. Huck.
Will E. Morris.
BY
Harness, Dickey, Pierce & Hann.
ATTORNEYS.

Sept. 15, 1936.   L. C. HUCK ET AL   2,054,629
METHOD OF MANUFACTURING RIVETS
Filed July 21, 1933   4 Sheets-Sheet 2

INVENTORS.
Louis C. Huck,
Will E. Morris.
BY
Harness, Dickey, Pierce & Hann.
ATTORNEYS.

Sept. 15, 1936.  L. C. HUCK ET AL  2,054,629
METHOD OF MANUFACTURING RIVETS
Filed July 21, 1933   4 Sheets-Sheet 3

INVENTORS.
Louis C. Huck,
Will E. Morris.
BY
Harness, Dickey, Pierce & Hann
ATTORNEYS.

Sept. 15, 1936.  L. C. HUCK ET AL  2,054,629
METHOD OF MANUFACTURING RIVETS
Filed July 21, 1933   4 Sheets-Sheet 4

INVENTORS.
Louis C. Huck,
Will E. Morris.
BY
ATTORNEYS.

Patented Sept. 15, 1936

2,054,629

UNITED STATES PATENT OFFICE 2,054,629

METHOD OF MANUFACTURING RIVETS

Louis C. Huck, Grosse Pointe Village, and Will E. Morris, Detroit, Mich., assignors, by direct and mesne assignments, to Huxon Holding Corporation, Detroit, Mich., a corporation of Michigan Application July 21, 1933, Serial No. 681,438

25 Claims. (Cl. 10—27)

The invention relates to rivets and it has particular relation to a method of and an apparatus for manufacturing rivets.

In certain respects the invention is related to that embodied in the application for patent of Louis C. Huck, Serial No. 604,759, filed April 12, 1932, which also involves methods of manufacturing rivets.

The invention is particularly concerned with the manufacture of a rivet comprising a tubular member and a pin extending therethrough, wherein the pin has a head on one end for applying axial forces to one end of the tubular member, and an end portion projecting beyond the other end of the tubular member for enabling gripping and pulling the pin axially through the latter. That end of the tubular member adjacent this gripping portion of the pin has a head for engaging one side of a structure to be riveted. The assembly is adapted to be inserted from one side through an opening in structural elements to be riveted, until the head on the tubular member engages the adjacent side of the structure, and then by pulling the projecting end of the pin and applying the reactionary force against the head on the tubular member, that portion of the tubular member projecting beyond the opposite side of the structure will be bulbed outwardly into a head during movement of the pin, as a result of axial forces imparted thereto through the head on the pin in conjunction with the reactionary force applied axially to the head on the tubular member.

In a more particular sense, types of rivets to which the invention is peculiarly related form the subject-matter of an application for patent of Louis C. Huck, Serial No. 681,362, filed July 20, 1933.

One object of the present invention is to provide an efficient, economical and accurate method of manufacturing rivets of the type described above, to the end that a uniform and inexpensive product will be obtained.

Another object of the invention is to provide a method of manufacturing and assembling a rivet of the general character designated previously, wherein the end of the tubular member is strengthened during the manufacturing process by a strain hardening and cold working operation.

Another object of the invention is to provide a method of manufacturing a rivet such as mentioned, wherein the various manufacturing and assembling steps are effected while the element which finally constitutes the tubular member, is held in an opening in a die or holding plate.

Another object of the invention is to provide a method of manufacturing rivets such as set forth, wherein the various manufacturing operations are performed simultaneously on different rivets, and wherein the manufacturing steps in connection with any one rivet, are performed in sequential order.

Other objects of the invention will become apparent from the following description and the claims hereinafter set forth.

For a better understanding of the invention, reference may be had to the accompanying drawings forming a part of the specification, wherein:

Figure 1 is a longitudinal and cross-sectional view of a rivet which may be manufactured according to one form of the invention.

Fig. 2 generally illustrates a rotary table that may be employed in manufacturing such rivets.

Figs. 3 to 11, inclusive, illustrate cross-sectional views of the table and various apparatus employed, during the several operations involved in manufacturing the rivet.

Figs. 12 to 18, inclusive, illustrate the several steps of a similar method, but wherein the tubular member in the finished assembly has different strength characteristics owing to cold working or strain hardening of certain portions thereof in the manufacturing process.

Figs. 19 to 26, inclusive, illustrate a third method of manufacturing a rivet construction for obtaining a similarly strain hardened tubular member as that obtained in the method illustrated by Figs. 12 to 18, inclusive, but the final steps in the manufacture are not illustrated as they are comparable to the steps illustrated in Figs. 9, 10 and 11.

Figures 1, 2, 3, 4, 5, 6, 9, 10, 11:
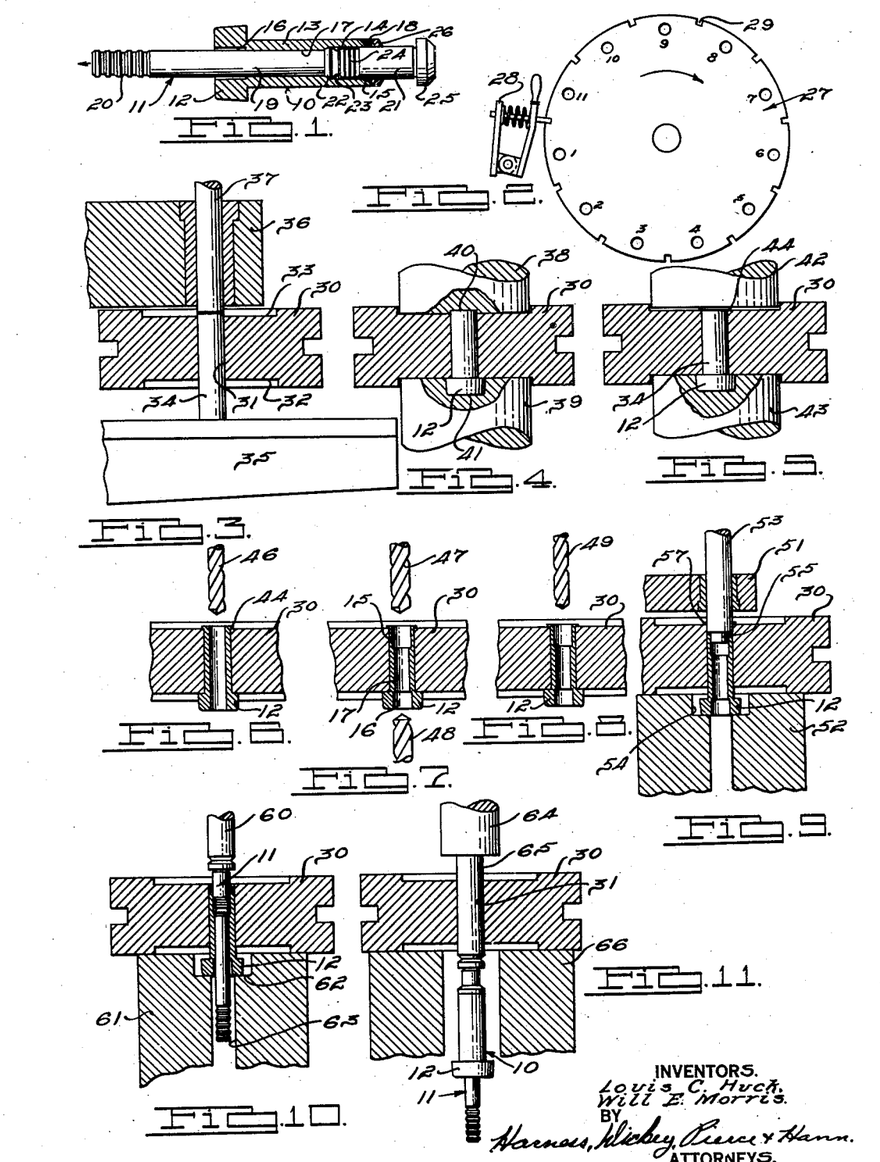

The rivet illustrated in Fig. 1 comprises a tubular member 10 and a pin 11 extending therethrough. The tubular member includes a head 12, a body portion 13 adapted to be located in the openings in a structure to be riveted, and a portion 14 which is adapted to be bulbed into a head during the riveting operation. Such portion 14 and the head 12 have openings 15 and 16 respectively which are substantially of the same diameter, but the body portion 13 has an opening 17 of smaller diameter. As shown by cross hatching and shading, the outer end of the portion 14 has a strain-hardened sector 18 and this is provided to increase the resistance of the end of the portion to outward expansion during formation of the bulbed head from such portion and resist pressures imposed thereon during the riveting operation.

The pin includes a portion 19 having an outer diameter substantially corresponding to the diameter of the opening 17 in the tubular member, and at the extreme left end of the pin, grooves or threads 20 are provided for gripping the pin and pulling it through the tubular member during the rivet setting operation. The pin also includes a portion 21 substantially corresponding in diameter to that of the openings 15 and 16 in the tubular member and at the left end of this portion, a shoulder 22 is provided for radially expanding the body portion 13 of the tubular member during axial movement of the pin to the left. A break neck 23 and locking grooves 24 are provided on this portion of the pin, respectively to the right of the shoulder 22 and at the extreme outer end of such portion of the pin, a head 25 is provided which substantially corresponds in diameter to the outer diameter of the body portion of the tubular member. Between this head and the end of the tubular member, an annular spreader ring 26 is provided on the pin, which is adapted to increase in outer diameter when it is forced against the end of the tubular member by the head 25.

This description sets forth mechanical details of the rivet assembly and for further disclosure as to the purpose of the various details and the manner of setting the rivet, reference may be had to the last mentioned of such copending applications for patent.

As a general illustration of apparatus that may be employed in manufacturing the tubular member and subsequently assembling it with the pin and spreader ring 26, a rotary table 27 is provided which is adapted to be turned intermittently by any suitable mechanism adapted for this purpose and to be retained in a temporarily locked position by means of an indexing device 28 adapted to cooperate selectively with notches 29 provided in the periphery of the table. As illustrated, eleven different manufacturing steps or changes may occur, during each of which the table is in a stationary and locked position and following which, the table moves one increment for the purpose of advancing the work to the next step or phase of the manufacturing operation. It will be appreciated that the number of steps or phases may be varied depending upon manufacturing requirements.

At each stage and shown by Fig. 3 for example, the table is provided with a holding die or member 30 having an opening 31 therein and shallow recesses 32 and 33 in the lower and upper faces of the die and which are concentric to the opening 31.

In manufacturing the tubular member, it is preferred first to provide an elongated and cylindrical element as indicated at 34 in Fig. 3, which may be manufactured separately as by severing it from wire of the required size. In the first stage of manufacture, one of the elements 34 is pushed upwardly or downwardly as may be found most efficient, through the opening 31 and this opening may be of such diameter that the element will be held in position by slight friction. The element 34 is positioned with its lower end protruding substantially below the member 30 and its upper end slightly protruding above the base of recess 33, by means of a lower reciprocatory member 35 and an upper reciprocatory member 36 including a plunger 37 adapted to engage the upper end of the element.

With the element in this position, the holding member moves into stage two and between upper and lower reciprocatory members 38 and 39 as shown by Fig. 4. The element during this movement may be held in the opening by friction, but as shown, the lower member 35 extends over to the reciprocatory member 39, and initially the latter is in a lower position so that the element 34 may ride over the upper surface of both members and then drop into the head forming recess 41 in member 39. The upper member 38 has a shallow recess 40 adapted to receive the slightly projecting upper end of the element 34 in a complementary manner, and the lower member 39 has the previously mentioned head forming recess 41 and as the latter moves upwardly the lower protruding end of the element 34 is upset to form the head 12, as shown by Fig. 1. It will be apparent that during this operation, axial forces imparted to the element 34 will cold work and strain harden the metal and in the head 12 expand the element radially to such extent that it will be locked in the opening 31, in a very positive manner. Then the reciprocatory members 38 and 39 are moved away from the holding member and the table moves through another increment and to stage three as shown by Fig. 5.

This brings the holding member 30 between upper and lower reciprocatory members 42 and 43 and the latter may be substantially identical to the reciprocatory member 39 shown by Fig. 4. The upper member 42, however, while similar to the member 38, does not have the recess 40, and when it moves downwardly against the slightly projecting upper end of the element 34 it upsets the projecting end and forms a head 44 having a greater diameter than that of the opening 31 and it will be appreciated that this head in conjunction with the head 12 positively rivets or locks the element to the holding member. The radial expansion of the element 34 and particularly in conjunction with the heads 12 and 44 positively locks and freezes the element in the opening against axial and turning movement with respect to the holding member 30, although in practice it seems that either the formation of heads 12 and 44 or radial expansion of the element alone is sufficient to lock it against turning or axial movement. Moreover, upsetting the metal in the upper end of the element strain hardens at least the projecting upper end thereof and increases its strength through a cold working principle.

The table then moves through another increment and to stage four as shown by Fig. 6, which brings the holding member under a drill 46 and when this drill moves downwardly it forms an opening through the element 34 and in this connection it may be mentioned that the diameter of this opening substantially corresponds to the diameter of the opening 17 in the tubular member as shown by Fig. 1. Also, it may be mentioned that instead of forming this opening through the element by using a single drill, several stages may be employed during which drills form successive parts of the opening. The advantage of using several stages is that the time for effecting each operation at any one stage may not be undesirably long.

Following formation of the opening through the element 34, the holding member moves to stage five as illustrated in Fig. 7, and between upper and lower drills 47 and 48 and these drills move partly into the opening in the element to form the larger openings 15 and 16 shown by Fig. 1, thus leaving the intermediate and smaller opening 17. Then in stage six and as shown by Fig. 8, the holding member 30 moves under a sizing drill 49 which is adapted to truly size the opening 17 of smaller diameter and remove any burrs.

In stage seven, as shown by Fig. 9, the holding member 30 moves between upper and lower members 51 and 52 and the former includes a plunger 53 substantially corresponding in diameter to the diameter of the opening 31 in the holding member but which is movable into the opening. The lower member 52 has an enlarged recess 54 for receiving the head 12 and the base of this recess is so located when the member abuts the member 30, that a substantial space is provided between the head 12 and such base. The plunger 53 also is provided with a pilot 55 adapted to enter the opening 15 in the element so as to maintain the shape of the tubular wall, and when the plunger is moved downwardly and this pilot enters the opening in the element, the plunger at the base of the pilot engages the end of the tubular wall and moves the element downwardly through the holding member. During this operation, an outer ring 57 is sheared from the head 44, thus leaving the body of the element substantially uniform in outside diameter so that it can move through the opening 31. It will be appreciated that this movement of the element also breaks the rivet lock between the element and the holding member and overcomes the stronger forces which have up until this point frozen the element in the opening. In other words, after this element is moved partially as shown by Fig. 9, a further movement through the holding member will not require as great a force.

After this operation and as shown by Fig. 10, the holding member 30 moves between an upper reciprocatory plunger 60, and a lower reciprocatory member 61 having a recess 62 for receiving and engaging the head 12 and an elongated opening 63 substantially coinciding with the axis of the opening in the holding member and in the element 34. During this stage, the pin 11 is inserted from the upper side, and preferably the spreader ring 26 will be held above the opening 31 or deposited in the upper end thereof, so that downward movement of the pin will also move it through the ring. The spreader ring also might be mounted on the pin prior to inserting it. In this connection it may be mentioned that the ring normally will have a slight press fit on the larger portion of the pin.

After initially inserting the pin, the plunger 60 moves downwardly and the pin moves therethrough until the shoulder 22 on the pin engages the shoulder at the junction of portions 15 and 17 of the tubular member. During this operation, the tubular member will be held in position by the lower member 61.

Then the holding member 30 moves between an upper plunger 64 having a portion 65 adapted to move through the opening 31 in the member, and a lower member 66 adapted to engage the holding member around the protruding rivet assembly but without engaging the head 12 thereon. Then upon movement of the plunger downwardly, the assembly is ejected from the opening 31 thus providing a finished rivet assembly ready for use. This operation is performed in stage 11 and a further movement of the holding member 30 and the table 27 brings it into stage one ready for another rivet manufacturing and assembling operation. It will be appreciated, of course, that during each movement of the table one increment, one of the different operations described is being performed on a rivet so that upon each increment of movement a finished rivet assembly is provided.

It will also be appreciated that in manufacturing the assembly thus described, the cold worked sector indicated at 18 in Fig. 1 is provided on the end of the tubular member and the provision of this sector is desirable during the rivet setting operation as is clearly described in my co-pending application for patent.

Figure 12:
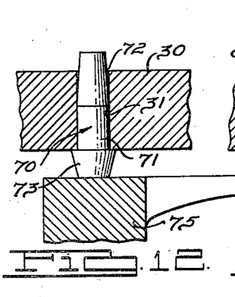

According to the process illustrated in Figs. 12 to 18, inclusive, and which may be effected by using the same rotary table 27, an element 70 is initially provided which has a portion 71 substantially corresponding in outside diameter to that of the opening 31 in the holding member, and an upper portion 72 which is slightly tapered in a conical fashion to a smaller upper end which projects above the holding member. The lower end of the element 70 has a tapered and partially formed head 73 and it will be appreciated that further upsetting of this head to form the head 12 on the finished tubular member of the rivet construction, will not require as much cold working and hence will not strain harden the metal in the head as much as the head 12 is strain hardened in the process previously described. In stage one as shown by Fig. 12, the element 70 is inserted and the lower reciprocatory member 75 moves it upwardly until the head 73 engages the lower side of the holding member, in which position the element may be held by a sufficiently snug fit in the opening 31, but preferably the lower member 75 will extend over to stage two shown by Fig. 13, so that the element may slide over the upper surfaces of such member and a lower reciprocatory member, and drop into a head forming recess in the latter, as previously described in connection with Figs. 3 and 4.

Figures 13, 14, 15:
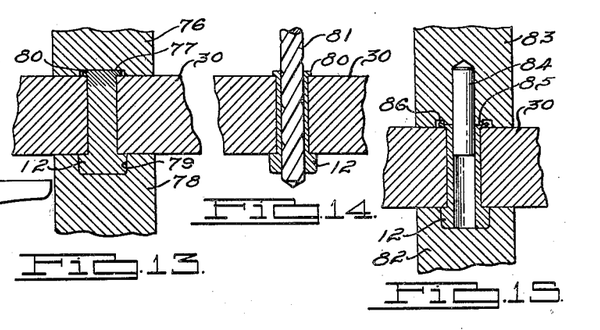

Upon movement of the table into stage two, the holding member 30 is brought into position between an upper reciprocatory member 76 having a shallow recess 77, and a lower reciprocatory member 78 having a recess 79 for forming the head 12 on the finished rivet member. Upon movement of these members toward the holding member, the head 12 is first formed by an upward movement of the lower member and then the upper and projecting end of the element 70 is upset in an axial and radial direction, not only to fill the space between the sides of the opening 31 and the tapered portion 72, but to radially flatten the still projecting end portion of the element into a head 80. It will be evident that there will be a progressive cold working of the metal from the upper end of portion 70 of the element to the upper end of the tapered portion and that greater cold working and strain hardening will occur progressively according to the upwardly increasing and initial clearance between the tapered portion and the sides of the opening 31 in the holding member. Furthermore, the head portion 80 will still further be strain hardened so that the gradient of cold working terminates on an annular sector defined by head 80 which is still stronger. It is evident that this operation will securely lock the element 70 in the opening 31 against turning and against axial movement.

Then the holding member moves to the next stage or several stages depending on the stages desired, where drills such as indicated at 81 in Fig. 14 form an opening longitudinally through the element which corresponds substantially in diameter to the diameter of the opening 17 in the tubular member of the finished rivet construction. Then the holding member moves between a lower reciprocatory member 82 having a complementary recess for receiving the head 12, and an upper reciprocatory member 83 having a pin 84 adapted to enter the opening in the element, and a rim 85 around such pin which is adapted to engage the end of the rivet element. Around this rim 85, an annular recess 86 is provided for the purpose of allowing a free movement of the outer peripheral portion of the head 80 while axially compressive forces are directed against the end wall of the element by the rim portion 85. This operation additionally strain hardens the protruding, upper end sector of the element and reduces the element to the proper or desired length.

Figures 16, 17, 18, 19, 20, 21, 22:
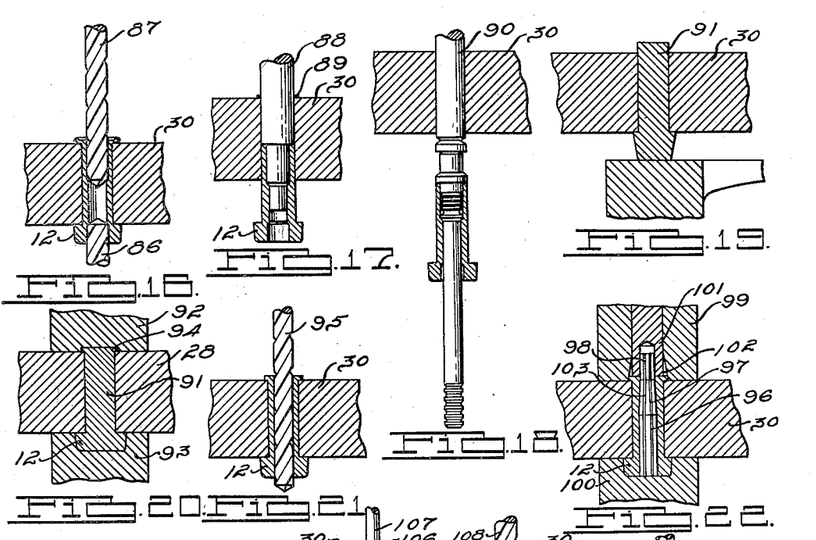

In the next stage, and as indicated in Fig. 16, upper and lower drills 87 and 86 are employed for enlarging the upper end portion of the opening in the tubular member and the opening in head 12. After this operation, a sizing drill may be employed if desired to size the opening 17 and remove burrs etc., but this is not illustrated. In the next stage, as shown in Fig. 17, a plunger 88 is employed for pushing the tubular member downwardly to a certain position and simultaneously shearing the outer rim portion of the head 80 to eliminate the outer ring of metal as indicated at 89. Then the rivet pin and spreader ring are assembled with the tubular member and the pin is pushed downwardly by a plunger 90 until the shoulder 22 on the pin engages the shoulder in the tubular member and then the assembly is removed. These operations may be effected by the apparatus shown in Figs. 10 and 11, and Fig. 18 is merely illustrative.

The method of manufacturing outlined in Figs. 19 to 25, inclusive, includes first, and as shown by Fig. 19, insertion of an element 91 having a head similar to the head 73 shown by Fig. 12, until the head engages the lower side of the holding member 30. The element is then held in position similarly to the manner described with respect to Fig. 12 until the holding member and element move into stage two as shown by Fig. 20. In this step upper and lower reciprocating members 92 and 93 are utilized and the lower member has an opening for forming and upsetting the metal to provide the head 12. The upper member has a shallow opening to form a thinner head 94 and during this process the element is locked against axial and turning movement relative to the holding member 30. The next step is to drill a hole longitudinally through the member 91 and it will be appreciated that several drilling steps may be employed. Fig. 21 illustrates this drilling to form the opening, and the drill is indicated at 95.

In the next step as shown by Fig. 22, a pin 96 is inserted into the tubular element from the lower end thereof and this pin has a tapered portion 97 tapering to a smaller upper end and a pilot portion 98 projecting above the holding member 30. When this pin is inserted, an upper reciprocatory member 99 is employed for axially compressing the tubular member and during this axial compression, a lower member 100 engages and holds the head 12 at the lower side of the holding member 30. The member 99 includes a plunger 101 for engaging the end of the tubular portion and which has an opening for receiving the pilot 98, and around such plunger and the periphery of the head 94, a socket 102 is provided for shrouding the head 94 and preventing radial expansion thereof. During the axial compression effected by movement of the plunger 101 downwardly through the member 99, the upper end of the tubular element is upset to close any clearances between the tapered portion 97 of the pin 96 and the inner wall of the tubular member and this naturally strain hardens the metal in a progressive manner, which increases from the lower end of the taper to the upper end of the element. For the purpose of preventing trapping air, oil, etc. between the tubular member and pin 96, shallow longitudinal grooves 103 may be formed in the surface of the pin to allow such air or oil to escape.

Figure 23:
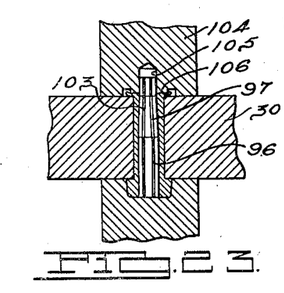
Figures 24, 25:
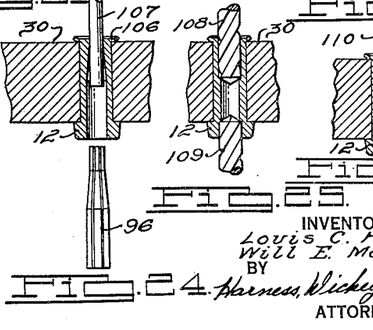

In the next step as shown by Fig. 23, an upper member 104 is employed which has an opening 105 for receiving the pilot 98 of the pin 96, and a rim portion 106 for further cold working the metal in the head 94 and reducing the length of the element to that desired. In the next step as shown by Fig. 24, an upper plunger 107 pushes the pin 96 downwardly through and from the tubular element. Then in the next stage as shown by Fig. 25, an upper drill 108 is employed for removing the taper in the upper end of the tubular element and also to form the enlarged opening 16 as previously described. A similar and lower drill 109 is employed to form the counterbore in head 12. Then in the next step shown by Fig. 26, a sizing drill 110 is used to size the opening in the intermediate portion of the tubular member and this is desirable particularly to remove any taper that might remain if the upper drill 108 should not penetrate far enough to eliminate all parts of the taper.

Following this operation, the rivet pin and spreader ring may be inserted and the assembly removed by steps similar to those shown by Figs. 9, 10 and 11.

Figures 27, 28, 29:
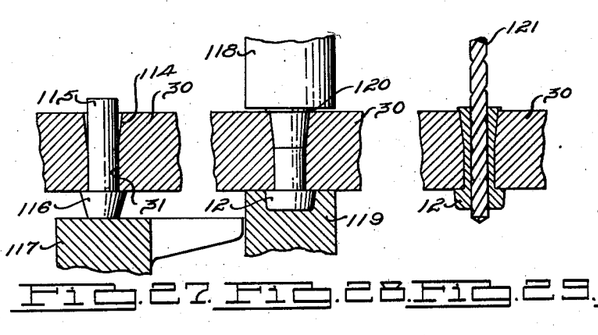
Figs. 27 to 34, inclusive, illustrate another method of manufacturing rivets wherein the tubular member has a progressively strain hardened portion.
Figure 30:
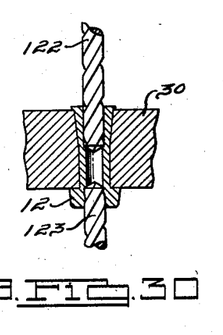

In the method illustrated by Figs. 27 to 34 inclusive, the openings in the holding members 30 have upper and outwardly tapering portions 114. The rivet element indicated at 115, has a partially formed head 116 and when it is inserted in the opening as shown by Fig. 27, its length is such that it projects substantially above the upper face of the holding member. The element may be positioned and held in position as previously described, and a lower holding member 117 may be used which extends to the next stage shown by Fig. 28. In the next step, the holding member moves between upper and lower reciprocating members 118 and 119, and the lower member is moved first and has a socket for forming the head 12 while the upper member 118 then is moved and axially compresses the rivet element and expands it radially while decreasing its length, to fill the space in the tapered portion 115 of the opening in the holding member. During this operation, a head 120 is formed at the upper and now enlarged end of the element and this head, the tapered portion, and the head 12 positively lock the element in the opening although, as previously stated, the radial expansion of the metal in the opening alone may be sufficient to lock the element against rotation as well as axial movement. It will be appreciated also that the gradient of cold working and strain hardening will be obtained and that the end sector will additionally be strain hardened.

Figures 31, 32, 33, 34, 35:
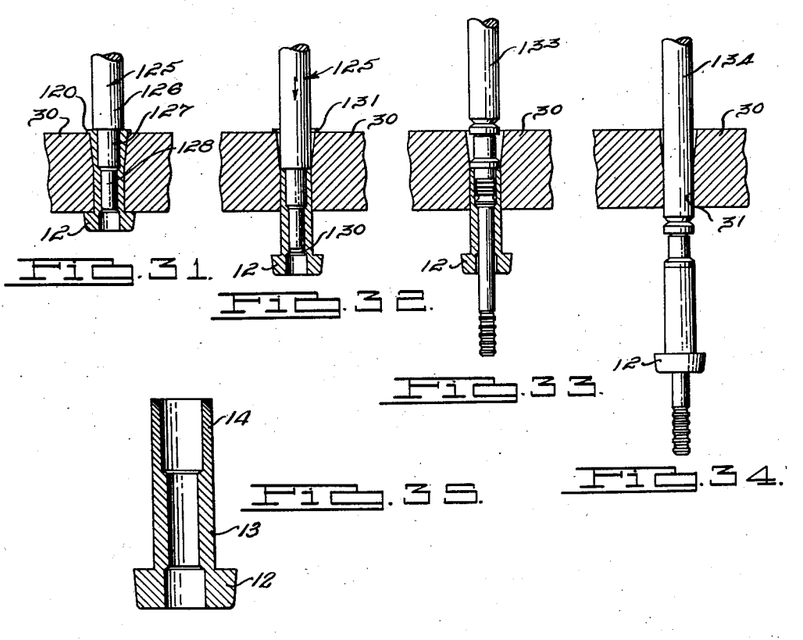
Fig. 35 illustrates a tubular member which may be manufactured according to the methods disclosed in Figs. 12 to 34, inclusive.

In the next step as illustrated by Fig. 29, a drill 121 is used to form an opening longitudinally through the element and it should be understood that the drilling operation may be effected in several stages so that the time required for any one stage may correspond to the time required for other steps in the manufacturing process. In the next step, the element moves between upper and lower drills 122 and 123 adapted to form the counterbores or enlarged openings in the upper end of the element and in the head 12. Following this operation, the opening may be sized, although this is not shown, and then the element moves under a plunger 125 shown in Fig. 31, and this plunger has a portion 126 substantially corresponding in diameter to the diameter of the lower and cylindrical portion of the opening 31, a reduced portion 127 adapted to enter the upper counterbore, and a lower reduced portion 128 adapted to render the opening in the element between the counterbores. As this plunger moves downwardly in the manner illustrated in Fig. 32, the element moves downwardly through the opening 31 in the holding member, and this effects a movement of the tapered portion of the element downwardly through the lower and cylindrical portion of the opening 31 which naturally causes an additional strain hardening or cold working of the metal in the tapered portion. Also some axial elongation or extrusion of the element may occur and this is illustrated in Fig. 32 by the space 130 shown between the lower end of the plunger and the counterbore in the head 12. During this downward movement of the plunger, a ring of metal 131 is sheared from the upper end of the element and possibly some excess metal may occur in the tapered portion of the opening, which finally moves over the portion 126 of the plunger. This movement of the plunger positions the element and at the same time so overcomes the lock between the element and the holding die, that a smaller force is required to further move it through the opening 31.

In the next step as illustrated in Fig. 33, the rivet pin and spreader ring are inserted and a plunger 133 is employed for moving the pin downwardly through the tubular element until the shoulder on the pin engages the shoulder at the lower end of the upper counterbore. Then in the next operation as illustrated in Fig. 34, a plunger 134 moves the entire assembly completely through the opening 31, thus providing the finished rivet.

This method of manufacture as well as the method disclosed in Figs. 12 to 26 inclusive, results in a tubular member which is progressively cold worked or strain hardened substantially throughout the length of the portion 14. This type of tubular member is illustrated in Fig. 35 and the progressive or gradient of cold working is illustrated by cross hatching. Moreover, at the upper end of the cold worked portion, a still more strain hardened sector is provided similar to that shown at 18 in Fig. 1.

Figure 36:
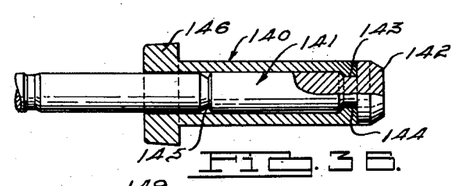
Fig. 36 illustrates another type of rivet which may be manufactured.

Referring now to Fig. 36, the rivet illustrated comprises a tubular member 140 and a pin 141 extending therethrough, which has a head 142 engaging the end of the tubular member. Such end of the tubular member has a thickened portion 143 which extends into an annular groove 144 in the pin adjacent head 142. The pin also is provided with a break neck 145 and to the left of the break neck, the pin is of slightly smaller diameter to facilitate inserting it into the tubular member from the right end. The tubular member is provided with a head 146 which is substantially identical to the heads on the tubular members previously described except that no counterbore is provided.

Figures 37, 38, 39, 40, 41, 42, 43, 44, 45, 46, 47, 48:
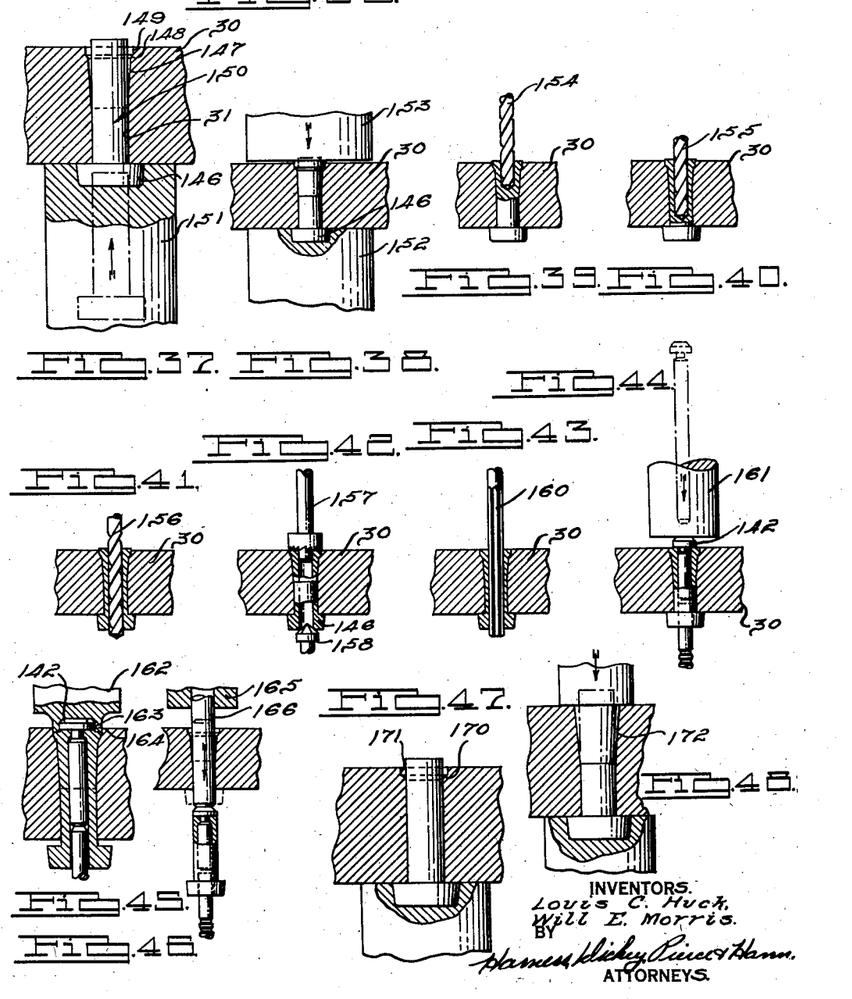
Figs. 37 to 46, inclusive, illustrate various operations in manufacturing the rivet shown by Fig. 36.
Figs. 47 and 48 illustrate modified apparatus and methods of manufacturing the rivet shown by Fig. 36.

In manufacturing this rivet, a holding member 30 is provided which has openings 31 therein tapered or flared outwardly as indicated at 147 and at the upper end of such taper, a slightly greater taper 148 is provided which terminates in a cylindrical shoulder 149. In the first step of the manufacturing process, a rivet element 150 is inserted which has a cylindrical body and the head 146 thereon and such element may be inserted by means of a lower plunger 151 having an opening for receiving the head 146. Preferably in this process, the element will be frictionally held in opening 31 and in the next step as shown by Fig. 38, a lower holding member 152 is used for holding the head 146, and an upper and reciprocatory plunger 153 is used for axially and radially upsetting the metal in the element, into the tapered portions 147 and 148 and the shoulder portion 149 of the opening in the holding member 30. If desired, however, the head 146 may be formed in the second stage as previously described in connection with the other processes. This upsetting of metal provides a gradient of cold working similar to that shown by Fig. 35.

Figs. 39, 40 and 41 illustrate the operation of drilling an opening longitudinally through the element in a progressive manner and the drills employed are indicated at 154, 155 and 156. In the next step as shown by Fig. 42, the rivet element and holding member are brought between a facing tool 157 adapted to face the upset end of the rivet element, and a lower tool 158 adapted to remove any burr around the opening in the head 146. In the next stage as shown by Fig. 43, the element is brought beneath a reaming tool 160 which is adapted to move downwardly through the opening in the rivet element and properly size it. In the next operation as shown by Fig. 44, the rivet pin is inserted from the upper end, and it will be recalled that the outside diameter of the gripping end of the pin is of slightly smaller size to facilitate insertion thereof into the tubular element. After partial insertion of the pin, a plunger 161 moves down against the head 142 on the pin and forces it through the tubular member until the head engages the upset end of the latter.

After this operation, the assembly of pin and tubular member is brought beneath a second plunger 162 as shown by Fig. 45, having a recess 163 for receiving and engaging the head 142 on the pin and a shroud 164 for engaging the end of the tubular element around such head on the pin. The shroud has an outer diameter closely corresponding to the diameter of the shoulder portion 149 of the opening 31 in the holding member and is movable thereinto. When this plunger is moved downwardly against the rivet assembly, the shroud will move that rim portion of the tubular element radially outward of the head 142 on the pin, in an axial direction into the opening 31 in the holding member, simultaneously with the movement of the pin and head 142 thereon. This is advantageous because if the plunger only engaged the pin head, the head might become partially buried in the end portion of the tubular element and it then would not be possible to later move the rim of metal partially enclosing the head, into the groove 144 in the pin. By using the shroud, partial burying of the head in the end of the tubular element is avoided as the metal in the shoulder portion of opening 31, is moved along with the head.

The movement of the plunger 162 is limited to a distance substantially as shown by Fig. 45, to insure final upsetting of the metal in the groove 144 and in fact during movement of this plunger, the groove may partially be filled as shown. Upon removal of the plunger 162, and movement to the next stage of the process, the rivet assembly is brought into alignment with a plunger 165 having a pin portion 166 adapted to engage the head 142 on the pin and to move the assembly through and eject it from the opening 31. During operation of plungers 162 and 165, the metal in the upset end of the tubular element is in fact extruded since it moves towards a smaller end of the taper or flare 147 in the opening 31, and finally through the lower and cylindrical portion of the opening. During the extrusion process, the tubular element may increase in length to some extent and the metal formerly in the tapered end of the opening is additionally strain hardened progressively from the beginning of the taper to the groove 144 in the pin. Also this process insures filling of the groove 144. Finally the assembly of rivet is ejected from the opening 31 as shown by Fig. 46. In the event there should be any surplus metal that is not absorbed in the strain hardening process by movement of metal into the groove 144, this will be sheared between the head 142 on the pin and the smaller end portion of the flared opening and may be removed from the opening after the assembly is ejected.

According to Fig. 47, the rivet element is disposed in openings in the holding member which do not have the upper tapered portion but only are provided with a short bevel 170 and a cylindrical shoulder 171, in which event the progressive cold working will be substantially eliminated and cold working limited to metal to be disposed in groove 144. Upon upsetting the metal into the larger end of the opening defined by the bevel 170 and the shoulder 171, and then during the final steps of removing the assembled rivet, the upset metal will be strain hardened and upset or moved into the groove 144 in the rivet pin. It will be understood that in using apparatus such as illustrated by Fig. 47, operations similar to those previously described will be used to provide the openings, to insert the pin, to move the metal into the groove in the pin and finally to eject the assembly.

According to Fig. 48, each opening in the holding member has a conical portion 172 but the angularity thereof may be slightly greater and may be of such degree, that the bevel 148 and shoulder 149 shown by Fig. 37, are eliminated. The same process previously described is employed in manufacturing and assembling the rivet and substantially the same strain hardening of metal in a variable manner, will be obtained.

The invention provides economical, efficient and rapid methods and apparatus for manufacturing rivets particularly of the general type described. Furthermore, the processes insure uniformity of rivet manufacture and hence insure uniformity in application of the finished rivet. The methods illustrated and described considerably decrease the cost of production and enable use of the rivets in a far greater field and particularly in fields where the cost of production might otherwise prohibit their use.

Although more than one form of the invention has been illustrated and described in detail, it will be apparent to those skilled in the art that various modifications may be made without departing from the scope of the appended claims.

We claim:

1. The method of manufacturing a rivet, which comprises disposing an elongated rivet element in an opening in a holding member, providing enlarged portions on both ends of the element to lock it to the member, forming an opening lengthwise through the element, and then removing the element from the member by forcing the element axially through the opening.

2. The method of manufacturing a rivet, which comprises disposing an elongated rivet element in an opening in a holding member, providing enlargements on both ends of the element to lock it to the member, forming an opening lengthwise through the element, and then removing the element by moving it axially through the opening in the member.

3. The method of manufacturing a rivet, which comprises providing an elongated element, forming an opening in a portion of the element, axially compressing the element and governing its radial expansion to form a portion having an axially tapered inner surface, and then eliminating the taper on said portion.

4. The method of manufacturing a rivet, which comprises providing an elongated element, inserting such element in an opening in a plate, axially compressing a portion of the element to strain harden the metal and lock it in the opening, forming an opening longitudinally through the element for receiving a rivet pin, inserting the pin into the opening, and then removing the assembly from the opening in the plate.

5. The method of manufacturing a rivet, which comprises providing an elongated element, forming an opening longitudinally through the element, enlarging said opening in one end portion of the element, providing a pin having a shoulder intermediate its ends, and inserting the pin in the opening until the shoulder is at the inner end of the enlarged portion of the opening.

6. The method of manufacturing a rivet, which comprises providing an elongated element, inserting the element into an opening in a plate, upsetting metal in the element to lock it in the opening, forming an opening longitudinally in the element, enlarging an end portion of such opening in the element, axially moving the element partially through the opening, providing a pin with an enlarged portion for entering the enlarged portion of the opening in the element, inserting the pin in such opening, and removing the assembly from the opening in the plate.

7. The method of manufacturing a rivet which comprises providing an elongated element, inserting it into an opening in a plate wherein the opening is enlarged at one point, axially compressing the element to lock it in the opening, forming an opening longitudinally through the element, inserting a pin into the opening in the element, and axially moving the assembly through the opening in the plate.

8. The method of manufacturing a rivet which comprises providing an elongated element, inserting it into an opening in a plate wherein the opening is enlarged at one point, axially compressing the element to lock it in the opening and upset the element into the enlarged part of the opening, forming an opening longitudinally through the element, inserting a pin in the element wherein the pin has a surface recess, and axially moving the assembly through the opening in the plate to cause the upset metal to move into the recess in the pin.

9. The method of manufacturing a rivet, which comprises disposing an elongated rivet element in an opening in a holding member, axially compressing the element at its ends to form enlargements and expand the element radially into tight fitting relation with the opening, forming an opening lengthwise through the element, and then removing the element by moving it axially through the opening in the member.

10. The method of manufacturing a rivet, which comprises disposing an elongated rivet element in an opening in a holding member, applying axial forces to opposed ends of the element to upset it and lock it in the opening, forming an opening lengthwise through the element, disposing a rivet pin in the opening in the element and removing the pin and element in assembled relation from the opening in the member.

11. The method of manufacturing a rivet, which comprises disposing an elongated rivet element in an opening in a holding member, applying axial forces to opposed ends of the element to upset it and lock it in the opening, forming an opening lengthwise through the element, disposing a rivet pin in the opening in the element and removing the pin and element in assembled relation from the opening in the member by axially moving the assembly through such opening.

12. The method of manufacturing a rivet, which comprises disposing an elongated rivet element in an opening in a holding member, upsetting the element in the opening to hold it tightly therein, forming an opening lengthwise through the element, inserting a pin having an enlargement into the opening in the element, and axially removing the assembly from the opening in the member by applying axial pressure on the pin so that the enlarged portion of the latter forces the element through the opening in the member along with the pin.

13. The method of manufacturing a rivet, which comprises disposing an elongated element in an opening in a holding member, upsetting the element in the opening to hold it tightly therein, forming an opening lengthwise through the element and enlarging said opening at one end of the element so as to provide a shoulder, inserting a pin having an enlarged portion into the opening in the element, and axially removing the assembly from the opening in the member by axially pushing the pin with such enlarged part of the pin engaging the shoulder.

14. The method of manufacturing a rivet which comprises inserting an elongated element into an opening in a holding member wherein the opening has a flared portion, upsetting the element to lock it in the opening and to flare portions of the element into the flared portion of the opening, forming an opening lengthwise through the element, inserting a pin into the opening, and axially removing the assembly from the opening in the member in such manner as to force the flared portion of the element through a smaller portion of the opening.

15. The method of manufacturing a rivet which comprises inserting an elongated element into an opening in a holding member, upsetting the element to hold it tightly in the opening and strainhardening an end portion of the element in an axially progressive manner, forming an opening lengthwise through the element, and then axially removing the element from the opening.

16. The method of manufacturing a rivet which comprises inserting an elongated element into an opening in a holding member, upsetting the element to hold it tightly in the opening and strainhardening an end portion of the element in an axially progressive manner, forming an opening lengthwise through the element, inserting a rivet pin into the opening in the element, and then axially removing the element from the opening.

17. The method of manufacturing a rivet which comprises inserting an elongated element into an opening in a holding member, upsetting the element to hold it tightly in the opening, forming an opening lengthwise in the element, inserting a pin into the opening wherein the pin has a reduced tapering end, axially compressing the element to upset it about the tapered portion on the pin, removing the pin, removing the internal taper on the element, inserting a rivet pin into the opening in the element, and then axially removing the assembly.

18. The method of manufacturing a rivet which comprises disposing an elongated rivet element into an opening in a holding member, upsetting the element to hold it in the opening, forming an opening lengthwise in the element, partially removing the element by axially moving it in the opening in the member, inserting a rivet pin into the opening in the element, and then axially removing the assembly from the opening in the member.

19. The method of manufacturing a rivet comprising a tubular member and a pin projecting through the tubular member and having an enlargement for engaging a portion of the tubular member, which comprises inserting an elongated element in an opening in a holding member, forming an opening longitudinally through the element, inserting said pin, and then pushing the tubular element and pin axially through the opening as an assembled unit.

20. The method of manufacturing a tubular rivet element, which comprises disposing an elongated element in an opening in a holding member with its ends projecting outwardly of the opening, axially compressing the element at its ends to form enlargements and to tighten the element in the opening, forming an opening longitudinally in the element, and then removing the element axially through the opening and simultaneously shearing off the peripheral portion of one of said enlargements to reduce its dimensions substantially to that of the opening.

21. The method of manufacturing a tubular element which comprises disposing an elongated element in an opening in a holding member with its ends projecting outwardly of the opening, axially compressing the element at its ends to form a head at one end and to strain harden the other end substantially as compared to an intermediate part of the element, forming an opening entirely through the element, and then removing the element from the opening by axially moving it through the latter.

22. The method of manufacturing a tubular element having a strainhardened sector at one end which comprises inserting an elongated element in an opening in a holding member, locking the element in the opening by axially upsetting its ends and radially expanding it into tightly fitting relation to the opening, forming an opening longitudinally through the element, and then removing the element by moving it axially through the opening.

23. The method of manufacturing an element having an axially progressive, strainhardened portion, which comprises inserting an elongated element in an opening in a holding member wherein the opening has an axially tapering portion, upsetting a portion of the element into such tapered portion of the opening whereby its radial thickness is progressively increased, and axially moving the element through the opening to pass such portion of the element through the smaller end of the opening.

24. The method of manufacturing a tubular element having an axially progressive, strainhardened portion, which comprises inserting an elongated element into an opening in a holding member, upsetting the element to hold it tightly in the opening and strainhardening a portion of the element in an axially progressive manner, forming an opening lengthwise through the element, and axially removing the element from the opening.

25. The method of manufacturing a tubular element having a strainhardened end sector, which comprises inserting an elongated element into an opening in a holding member, with one end of the element projecting from the opening, applying axial forces to the ends of the element to expand it into tightly fitting relation to the opening and to form a strain hardened head from such projecting end, and then forcing the element through the opening by pressure on such head and shearing off the outer portion of such head so as to leave a strain hardened end sector passable through the opening.

LOUIS C. HUCK.
WILL E. MORRIS.